United States Patent
Hajj et al.

[11] Patent Number: 6,064,768
[45] Date of Patent: May 16, 2000

[54] MULTISCALE FEATURE DETECTOR USING FILTER BANKS

[75] Inventors: Hazem M. Hajj, Hillsboro, Oreg.; Roland T. Chin, Clear Water Bay, The Hong Kong Special Administrative Region of the People's Republic of China; Truong Q. Nguyen, Burlington, Mass.

[73] Assignee: Wisconsin Alumni Research Foundation, Madison, Wis.

[21] Appl. No.: 08/884,760

[22] Filed: Jun. 30, 1997

Related U.S. Application Data

[60] Provisional application No. 60/027,422, Jul. 29, 1996.

[51] Int. Cl.$^7$ .............................. G06K 9/46; G06K 9/66; G06K 15/316; G06F 7/38
[52] U.S. Cl. .......................... 382/195; 382/190; 382/260; 382/278; 364/724.2; 364/728.03
[58] Field of Search .................................... 382/190, 195, 382/260, 275, 318, 189, 278; 364/724.2, 728.03

[56] References Cited

U.S. PATENT DOCUMENTS

| | | | |
|---|---|---|---|
| 5,038,382 | 8/1991 | Lipscomb | 382/189 |
| 5,267,329 | 11/1993 | Ulich et al. | 382/260 |
| 5,448,654 | 9/1995 | Katayama et al. | 382/260 |
| 5,526,446 | 6/1996 | Adelson et al. | 382/275 |
| 5,638,503 | 6/1997 | Hoel | 345/442 |
| 5,673,332 | 9/1997 | Nishikawa et al. | 382/260 |

OTHER PUBLICATIONS

The Laplacian Pyramid as a Compact Image Code, IEEE Transactions On Communications, vol. Com 31, pp. 532–538, No. 4, Apr. 1983, Burt, et al.

Scale–Space Methods, Encyclopedia of Artificial Intelligence, S. Shapiro, ed., Wiley, New York, 1987, 973–980.

Characterization of Signals From Multiscale Edges, Technical Report No. 592, Robotics Report No. 258, New York University, Dept. Of Computer Science, Nov. 1991, Mallat, et al.

Haaj, et al "On Multi–Scale Feature Detection Using Filter Banks", IEEE, Mar. 1996

Jaggi, et al "MultiScale Geometrical Feature Extraction And Object Recognition with Wavelets and Morphology", IEEE, Sep. 1995.

Banham, et al "MultiScale Adaptive Image Restoration in the Wavelet Domain", IEEE, 1994.

Kawashima, et al "Qualitative Image Analysis of Group Behaviour, "IEEE, 1994.

Devin, et al "Application of MultiScale Filtering in Biomedical Signal Processing, "IEEE, Sep. 1992.

*Primary Examiner*—Leo H. Boudreau
*Assistant Examiner*—Daniel G. Mariam
*Attorney, Agent, or Firm*—Quarles & Brady, LLP

[57] ABSTRACT

A detector system locates a feature in an input signal. The input signal is applied to a multiscale filter bank which produces a corresponding set of filtered signals that are applied to a multiscale detector. A scale space tree table is produced by the detector which indicates the location in each filtered signal where the feature is possibly located. A MAP correlator examines the scale space tree table to determine which indications therein are feature locations. One-dimensional and two-dimensional embodiments are described. In addition, the design framework is disclosed for extending a one scale filter to a multiscale filter, for designing a filter bank from the multiscale filter and for designing the MAP correlator dependent on the feature being located and the chosen filter bank.

6 Claims, 7 Drawing Sheets

INDICATIOR RESPONSE TABLE — 140

| INDICATOR LOCATIONS | INDICATIOR VALUES |
|---|---|
| LOCATION 1 | VALUE |
| LOCATION 2 | VALUE |
| LOCATION 3 | VALUE |
| LOCATION 4 | VALUE |
| LOCATION n-1 | VALUE |
| LOCATION n | VALUE |

FIG. 8

SCALE SPACE TREE TABLE — 142

| | LOCATION 1 | LOCATION 2 | LOCATION 3 | | LOCATION n |
|---|---|---|---|---|---|
| SCALE 1 INDICATORS | VALUE | VALUE | VALUE | | VALUE |
| SCALE 2 INDICATORS | VALUE | | VALUE | | VALUE |
| SCALE 3 INDICATORS | VALUE | | VALUE | | |
| SCALE 4 INDICATORS | VALUE | | VALUE | | |

FIG. 9

MULTISCALE FEATURE DETECTOR USING FILTER BANKS

CROSS-REFERENCE TO RELATED APPLICATION

This application is based on Provisional Application No. 60/027,422 filed on Jul. 29, 1996.

"This invention was made with United States Government support awarded by the National Science Foundation: NSF Grant No.: MIP-9501589. The United States Government has certain rights in this invention."

BACKGROUND OF THE INVENTION

The field of the invention is the detection of features in images, and particularly, the detection of features such as edges in two-dimensional images.

There are numerous applications in which images are analyzed to locate specific features. For example, an object may be scanned with a camera and the edges of the object may be detected and used to locate the object and determine its orientation. Edge detection is also used in establishing the boundaries of an object so that it may be identified using pattern recognition methods, or measured. For example, an ultrasound image of the human heart may be analyzed by first locating the edges of the various heart chambers and then calculating the sizes of those chambers and the thicknesses of the chamber walls.

There are many approaches used to detect features in images. One approach is to fit a model of the feature to the image. The model is moved around the image and where there is a good match the feature location is indicated. Other methods use probabilistic measures, and most methods use filtering techniques which attempt to remove noise without obscuring the feature being detected. Filter operators such as the Roberts operator, Haar operator, Sobel operator, Canny's detector and wavelet transform are used to enhance images as a first step in feature detection, but the effectiveness of such filtering is determined by the choice of the filter scale. The choice of the filter scale may be arbitrary, or it may be based on results from prior applications of a similar nature. If the filter scale is large, filtering is intense and noise is smoothed out at the expense of lost localization of a detected feature or even failure to detect a feature. If the scale is small, on the other hand, less filtering is used and the results may be corrupted by noise which produces false alarms.

SUMMARY OF THE INVENTION

The present invention is a method and apparatus for detecting features in an acquired image, and particularly, it includes: a multiscale filter bank which applies a filter operator to the image data to produce a plurality of filtered outputs at a corresponding plurality of scales; a detector for each filtered output which indicates the locations of a selected feature therein, and a MAP correlator which correlates the filtered output values at each indicated feature location with a model response and produces an output signal indicative of the presence of the feature at the location if the correlation exceeds a preset threshold.

A general object of the invention is to provide a feature detection system which is robust. Nearly all state-of-the art feature detectors work satisfactorily when the image is not corrupted with noise.

However, using the multiscale filter bank and the map correlator of the present invention enables the same features to be accurately located even when there is substantial noise in the image. Noise is a very significant factor, for example, with medical images and the present invention is particularly useful in such applications.

Another object of the present invention is to match the MAP correlator with the multiscale filter so that optimal performance is achieved. The model response and the preset threshold used by the MAP correlator to determine the presence of a feature are precisely determined by the operating parameters of the chosen multiscale filter bank.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

GENERAL DESCRIPTION OF THE INVENTION

Figure 1:
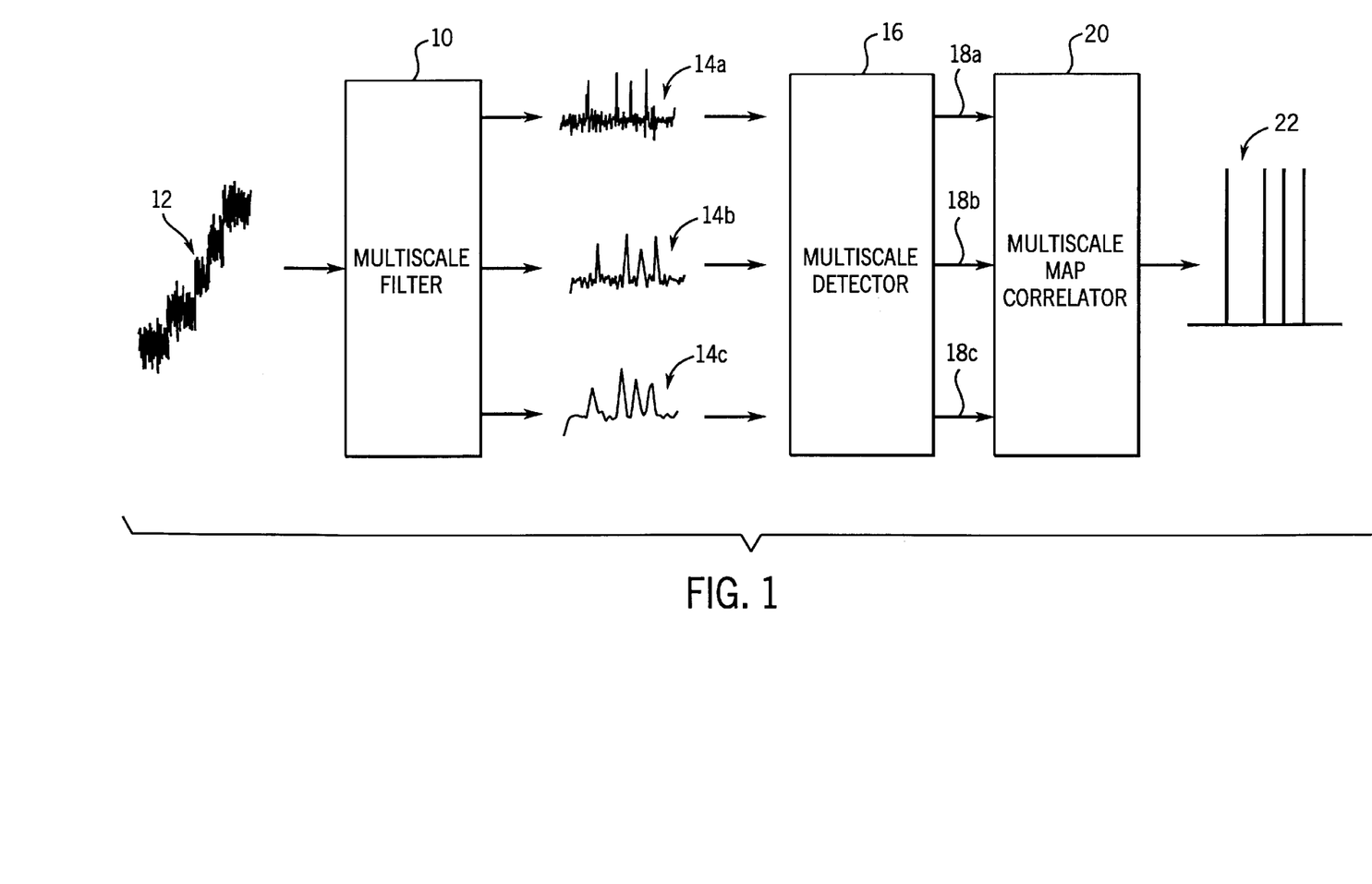
FIG. 1 is diagram of the elements of a feature detection system.

The present invention is a system for detecting and locating features in an input signal. Referring to FIG. 1 it includes a multiscale filter 10 which receives the input signal 12 and filters the signal to produce a set of filtered output signals 14a–c. The filtered output signals 14a–c represent the same input signal 12, but they are filtered at different "scales". The lower scale signal 14a is the highest resolution signal and it has undergone the least filtering. The highest scale signal 14c has been filtered the most and it is the lowest resolution signal. While 1D signals are shown in FIG. 1, 2D signals such as images and 3D signals such as image sequences (video) may also be processed.

The multiscale filtered signals 14a–c are applied to a multiscale detector 16. The detector 16 provides an indication of the location in the filtered signals 14a–c of the desired feature. "Features" to be detected may include, for example, step edges, roof edges, and pulse edges, and these may be "indicated" by maxima, zero-crossing, or a constant interval in the filtered signals. For example, maxima and zero-crossings are two common indicators for detecting edges and the choice of indicator will depend on the feature to be located and the type of filter used. For example, when the feature is a step edge, a maxima detector may be paired with a filter such as that described by Canny, "first difference operator, first derivative of Gaussian" or a quadratic spline filter. On the other hand, a zero-crossing detector may be paired with a Laplacian of Gaussian (LOG) filter. Regardless of the choice, the multiscale detector 16 produces samples of the filtered signals 14a–c at each indicated location at corresponding outputs 18a–c. The multiscale detector 16 in essence identifies locations in the filtered signals 14a–c where the feature may be present and masks out the remainder of the signal. This step significantly reduces the processing burden on a multiscale MAP correlator 20 which makes the final determination if the feature is present.

The multiscale MAP correlator 20 makes the final decision of where the feature occurs in the signal 12 and produces an output 22. As will be described in more detail below, it makes this determination by correlating the detector output signals 18a–c with a reference vector that represents the expected response when the feature is present. This reference vector as well as the threshold value of the correlation required to indicate the presence of the feature is precisely defined. In a 1D system the output 22 indicates the times at which the feature occurs in the signal 12, whereas in a 2D system the output 22 is a bit map showing where in the 2D input signal 12 the feature is located.

The construction of the multiscale filter for this system must meet a number of design criteria. The highest resolution filter is the smallest filter in the multiscale set, and it is the most critical for localization of the feature. To determine the highest resolution scale, one needs to examine the Fourier transforms of the desired set of filters. The filters in the multiscale set have to preserve their shape and symmetry, and this should be apparent in their responses. This is a necessary condition for the extension of one-scale filters to multiscale. Starting from the least number of samples, two for even-length filters and three for odd-length filters, the z transforms of the filters in the set are computed. The lowest scale is then chosen where:

1. The frequency transform starts showing consistency at the higher scales. This is verified by checking the sampling relation between successive scales. The "pulse" waveform is an example of a one-scale filter where consistency is not found, and accordingly the samples are unsuitable for multiscale feature detection.
2. The filter's response must be bandlimited. This is necessary since the multiscale filters will be implemented using analysis filter bank. The cascade combination of filters becomes equivalent to reconstructing a larger support filter from a smaller filter. This is a special case of reconstruction, and aliasing must be avoided.
3. The highest resolution filter corresponds to the filter with the smallest support. Therefore, this filter's response satisfies the above two constraints, and has its bandwidth closest to $\pi$. This results in a maximally decimated filter, and higher scales are oversamples.

The details of this procedure are now described for the Haar filter, and similar methods are applied to other filter operators without detailing the steps.

The sampling rules described above are applied to the Haar wavelet as follows:

$$g(t) = \begin{cases} -1; & -1 < t < 0 \\ 1; & 0 < t < 1 \\ 0 & \text{otherwise.} \end{cases}$$

Figure 2:
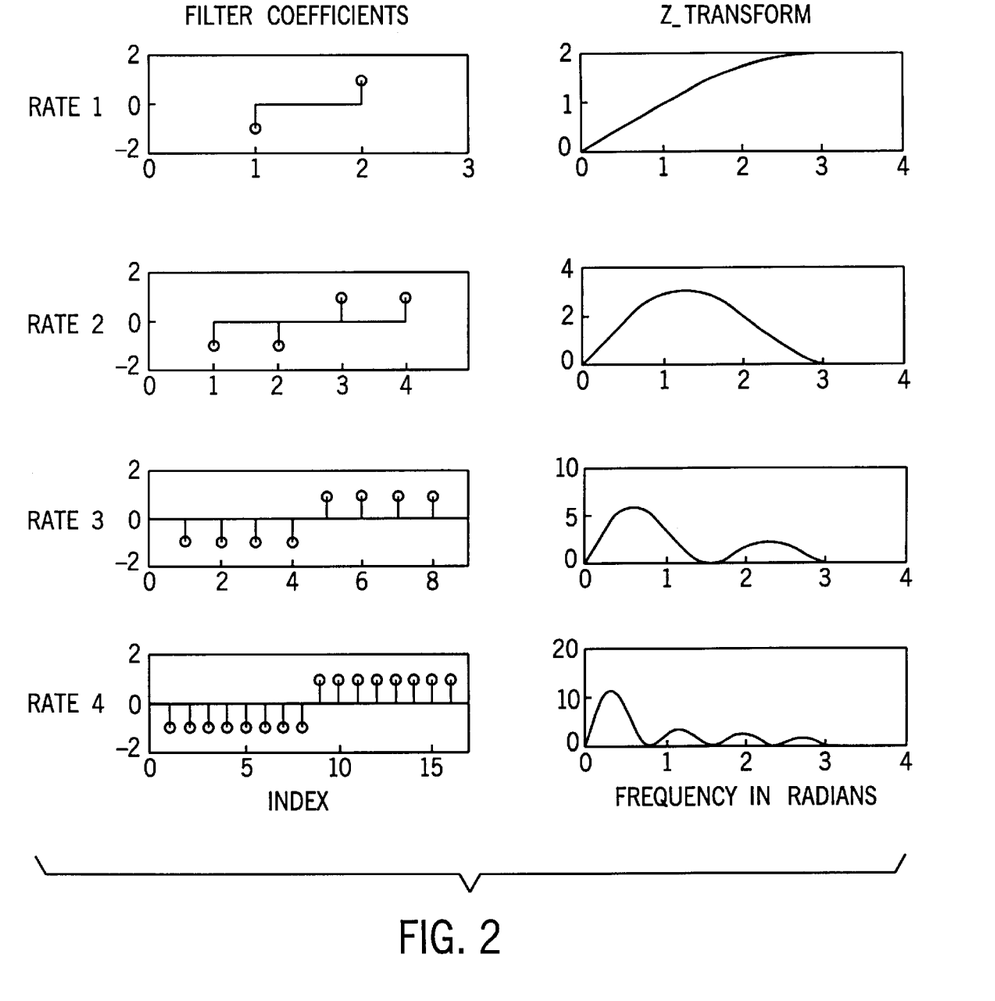
FIG. 2 is a graphic representation of discrete multiscale filters at different sampling rates and their corresponding frequency transforms derived from the Haar wavelet.

Samples of this wavelet give a type 1 filter that is symmetric with even length. Assume that the largest support filter has length 16. The Haar wavelet is uniformly sampled to get those 16 samples as shown in FIG. 2 at rate 4 (rate and scale are used interchangeably here). The smaller support filters are derived by further decimation as seen at lower rates in FIG. 2. To find the highest resolution filter $G_0(z)$ which has the least number of samples, one needs to examine the frequency responses. We observe the following results of the different sampling rates: The first filter, of length two at rate 1, passes components at frequency $\pi$. However, the second filter of length four at rate 2 does not. This is a first sign of inconsistency where the first filter is not bandlimited. In addition, the z-transforms of both filters do not seem to correspond to filters related by sampling. This is another critical sign of inconsistency. On the other hand, comparing the second filter to the third, and so on, consistency is observed in the responses. The conclusion is that the smallest filter, where consistency starts to show, must be of length four (at rate 2). Detection of features using a multiscale filter is reinforced from the consistency of response at all scales, and if the filter does not provide this property, then it is not suitable for multiscale feature detection according to the present invention. Other filters that may be employed in the present invention include:

Laplacian of Gaussian (LOG), where the smallest filter has length 17;

first derivative of Gaussian (FOG), where the smallest filter has a length of 9;

triangular waveform, where the smallest filter has a length of 5;

sawtooth waveform, where the smallest filter has a length of 9.

Figure 3:
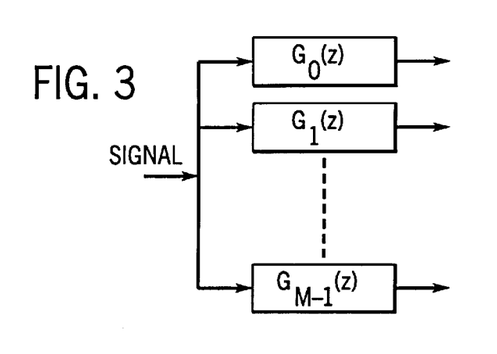
FIG. 3 is a diagram of a multiscale filter.
Figure 4:
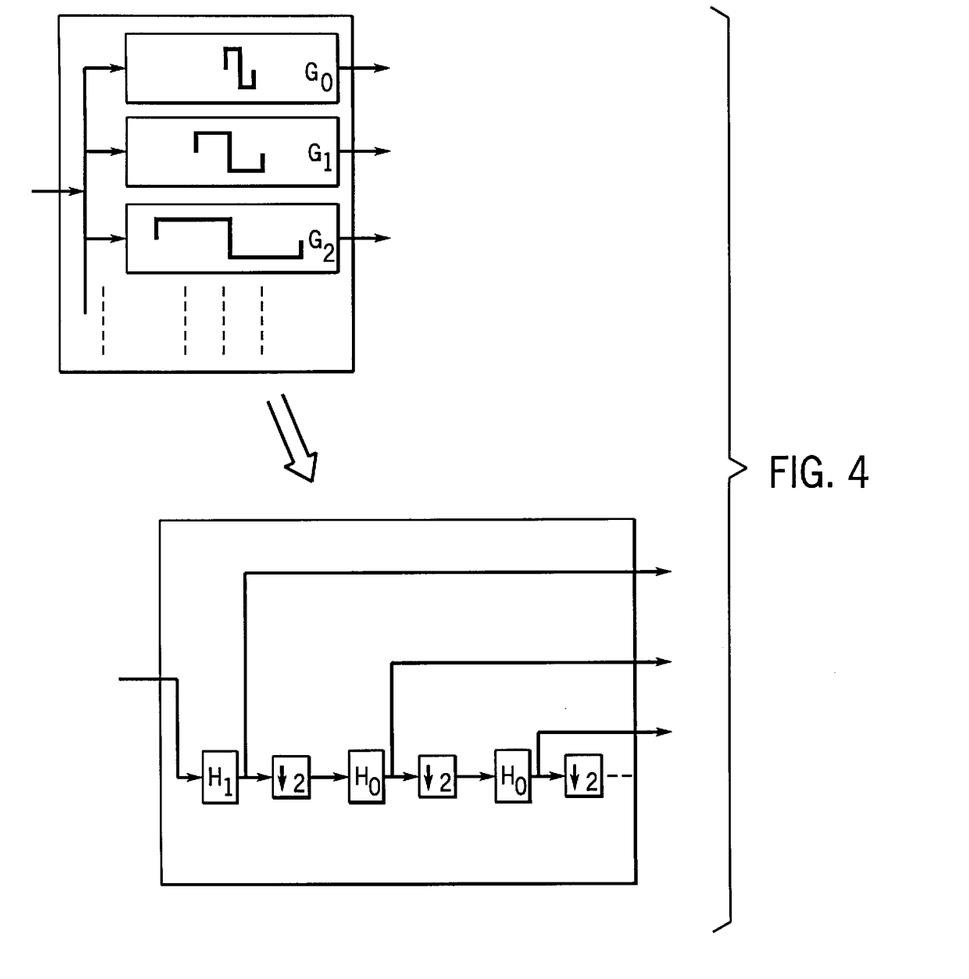
FIG. 4 is a schematic representation of the relationship between a multiscale filter and a corresponding multiscale filter bank.

The filters in this set of acceptable filters are denoted herein by $G_k(z)$. These filters can be implemented in parallel as shown in FIG. 3, but a more efficient structure is to implement these filters in a filter bank as shown in FIG. 4. For some choices of $G_k(z)$ an exact filter bank implementation is possible, and in other cases an approximation is used, as will be discussed below.

The concepts discussed above may be extended to cover the 2D domain. It is assumed that a one-scale filter has been derived for optimal detection of the desired feature. The filter can be either separable or non-separable. For example, separable and non-separable Roberts and Sobel operators may be used to detect vertical and diagonal edges respectively. The size of such filter operators is chosen to cover the largest scale of interest.

This 2D filter is then used to generate a set of multiscale 2D filters by applying different sampling rates. The sampling lattice can be characterized by a 2×2 nonsingular integer matrix. In 1D, the relation between a signal x (n) and its decimated version $x_s(n)$ by a factor M is given by: $x_s(n) = x(Mn)$. In 2D, the decimation factor is given by the determinant of the decimation matrix D. The relation between the 2D signal and its decimated version is given by: $x_s(n) = x(Dn)$.

Two conditions are imposed on the decimation matrix D:

In the 1D approach described above, the decimation rate is 2. This choice is common in multiresolution analysis for dyadic scales, and can be easily implemented using two channel filter banks. By analogy to the 1D case, the 2D rate should achieve a sampling density as power of four. This results in the requirement that the determinant of D is 4.

However, the choice is not unique. This leads to the second condition which limits the alternatives.

In the development of the detector, it is assumed that an isolated feature indicator persists at all the scales. This implies that the decimator can not alter the shape of the filter.

Combining these two constraints leads to the unique decimation matrix given by:

$$D = \begin{bmatrix} 2 & 0 \\ 0 & 2 \end{bmatrix}.$$

Figure 5:
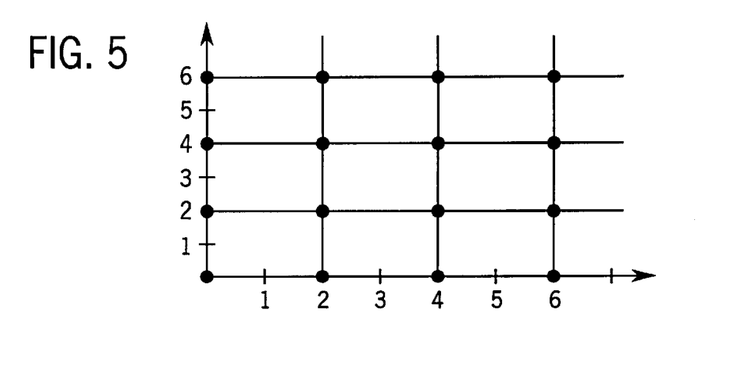
FIG. 5 is a graphic representation of a sampling lattice produced by a decimator D used in a 2D filter bank of the present invention.

The generated sampling lattice resulting from this decimation matrix is shown in FIG. 5. Note that this lattice does not necessarily lead to separable filters. For example, 2D filters with symmetry along diagonals can be designed to detect features at 45 degree angles. This is not possible with the separable processing approach of 1D filters which restricts the detection to horizontal and vertical directions only. Similarly, other non-separable filters can also be derived using the 2D method.

With this choice of sampling lattice, a one-scale 2D filter generates a set of 2D discrete filters, denoted by $G_i$ for each scale i. These filters are related by the decimation matrix D: $G_i(z)=G_{i+1}(z^D)$. This decimation relation lends itself to a natural implementation as a filter bank. To derive this set, the one-scale 2D filter provides support large enough to cover the largest scale of observation and the rest of the filters are successively derived by decimation on the lattice of FIG. 5. As with the 1D filter, the multiscale 2D filter $G_i$ may be implemented in parallel, but a better solution is a tree structure filter bank as will be described below.

In designing the 1D filter bank, the relation between the parallel and serial multiscale filter implementation in FIG. 4 is discussed first. Given the desired set of filters $G_i(z)$, one needs to find the FIR filters $H_0(z)$ and $H_1(z)$ such that:

$$G_0(z) = H_1(z) \quad (1)$$
$$G_1(z) = H_0(z^2)H_1(z)$$
$$G_2(z) = H_0(z^4)H_0(z^2)H_1(z)$$
$$\vdots \quad \vdots$$

$H_1(z)$ must match $G_0(z)$, and since application restricts the choice of $G_0(z)$, $H_1(z)$ must follow. This gives the first part of the filter bank, and to provide symmetry in the response, it needs to be a linear phase FIR. For the other part $H_0(z)$, several restrictions can be drawn by examining the structure. It should be noted that a cascade of filters, as shown in FIG. 4, is equivalent to one of the $G_k(z)$ filters. The properties of the equivalent filter at any scale should not be altered by the cascade leading to the next scale. For example, if $H_1(z)$ is even-length and $H_0(z^2)$ is even-length, then the combination would not have an even-length and this would contradict the desired $G_1(z)$. Therefore, $H_0(z)$ needs to be symmetric of odd length to preserve characteristics, such as symmetry and anti-symmetry, across scales.

An exact solution for $H_0(z)$ exists and is given by:

$$H_0(z^2) = \frac{2G_0(z)}{\left(G_1\left(z^{\frac{1}{2}}\right) + G_1\left(-z^{\frac{1}{2}}\right)\right)}, \quad (2)$$

if the roots of $$G_1\left(z^{\frac{1}{2}}\right) + G_1\left(-z^{\frac{1}{2}}\right)$$

are also roots of $G_0(z)$.

This is demonstrated as follows. Since $G_0$ can be obtained by subsampling $G_1$, then $$G_0(z) = \frac{1}{2}\left[G_1\left(z^{\frac{1}{2}}\right) + G_1\left(-z^{\frac{1}{2}}\right)\right].$$

In addition, $G_1(z)=H_0(z^2)H_1(z)$. Combining the two equations, yields equation (2).

The above result may not always be satisfied. In addition, $H_0(z)$ is not guaranteed to be linear phase. The Haar filter is an example where this requirement is satisfied, and a linear phase FIR solution can be found. In this case, $$G_0(z) = -1 - z^{-1} + z^{-2} + z^{-3}$$
$$G_1(z) = -1 - z^{-1} - z^{-2} - z^{-3} + z^{-4} + z^{-5} + z^{-6} + z^{-7}$$
$$\vdots \quad \vdots \quad \vdots$$

and the exact solution is:

$$H_0(z) = 1 + 2z^{-1} + z^{-2} \text{ and } H_1(z) = -1 - z^{-1} + z^{-2} + z^{-3}. \quad (3)$$

The Haar filter is one example of an exact solution, but others are possible. In general, it is difficult to extend one-scale filters to multiscale filters satisfying the filter bank constraints. However, the reverse process is straightforward. A one-scale filter can be easily drawn from a filter bank by a simple collapsing of the cascaded filters. This is achieved by convolution of frequency multiplication.

In cases, where the requirement in equation (2) is not satisfied, an approximate solution based on least-squares approximation can be made. The desired filter $H_0(z)$ should be chosen to minimize the error function:

$$V_r(h_0) = \sum_{i=0}^{r-1} (1/L_i)\|g_i - g_{i-1} * h_{0i}\|^2$$

where $h_{0i}$ is the upsampled version of $h_0$, r is the number of scales used in the analysis, and $L_i$ is the length of $g_i$.

The following can also be proven. Let N+1 be the size of filter $h_0$, E be an extension matrix of size $(2N+1)\times(N+1)$, $U_i$ be an upsampling matrix of size $(L_{i+1}-L_i-1)\times(L_{i+1}-L_i)/2$, and $G_i$ the convolution matrix of size $L_{i+1}\times L_i$. They are $$E = \begin{bmatrix} 1 & 0 \\ 0 & 1 \\ 1 & 0 \end{bmatrix}, \quad U_i = \begin{bmatrix} 1 & & 0 \\ 0 & \cdots & 0 \\ & \vdots & \\ 0 & & 1 \end{bmatrix} \quad G_i = \begin{bmatrix} g_i(0) & & 0 \\ g_i(1) & g_i(0) & \\ g_i(2) & \ddots & \ddots \\ \vdots & & \end{bmatrix}$$

Furthermore, $$C = \sum_{i=1}^{r} \frac{1}{L_i} C_i \quad C_i = B'_{i-1} G'_{i-1} G_{i-1} B_{i-1} \quad B_0 = EU \qquad (4)$$

$$a = \sum_{i=1}^{r} \frac{1}{L_i} a_i \quad a_i = g'_i G_{i-1} B_{i-1} \quad B_j = \left(\prod_{i=1}^{j-1} U_i\right) B_0$$

$V_r(h_0)$ is minimum if $h_0 = B_0 C^{-1} a^r$.

The above procedure may be used to design a filter bank for 1D feature detection based on the set of multiscale filters that are derived from a one-scale filter. This filter bank can also be used for 2D applications by applying separable processing, however it is not suitable for 2D applications where non-separable filters are required. In addition, 2D filters have different support regions than 1D filters, and therefore the responses may be different.

Conceptually, the formulation of a 2D filter bank is similar to the one dimensional case discussed above. Decimation matrices replace integer decimation, and matrices replace vectors in the signal representation. The set of filters $G_i(z)$ is generated from a given one-scale 2D filter as explained in the previous section. The index i corresponds to the scale of observation, and it reflects the support size of the filter $G_i$. One needs to design $H_0(z)$ and $H_1(z)$ such that:

$$G_0(z) = H_1(z) \qquad (5)$$

$$G_1(z) = H_0(z^D) H_1(z)$$

$$G_2(z) = H_0(z^{D^2}) H_0(z^D) H_1(z)$$

$$\vdots \quad \vdots$$

Moreover, the phase and length of the desired filters need to satisfy certain constraints as follows. The length of $H_1$ is the same as that of $G_0$, and the length of $H_0$ can be derived from the lengths of $G_0$ and $G_1$. Since symmetry and shape are preserved across the filters $G_i$, the same is expected when upsampled versions of $H_0$ are cascaded with $H_1$. This accordingly constrains $H_0$ to be symmetric.

An exact solution $H_0(\omega)$ exists and is given by $$H_0(D'\omega) = \frac{G_1(\omega)}{\left(\frac{1}{J(D)} \sum_{k \in N(D^T)} G_1(D^{-T}(\omega - 2\pi k))\right)}, \qquad (6a)$$

if the roots of the denominator are also roots of the numerator. J(D) represents the sampling density of the decimeter D, and $N(D^T)$ is the set of integer vectors that lie inside the fundamental parallelepiped of $D^T$. This can be demonstrated as follows. $G_0$ is the resulting filter when $G_1$ is cascaded with the decimator D. In other words, it is the decimated filter version of G, and $$G_0(\omega) = \frac{1}{J(D)} \sum_{k \in N(D^T)} G_1(D^{-T}(\omega - 2\pi k)).$$

On the other hand, from the equivalence of the filterbank structure to the parallel implementation $G_1(\omega) = H_0(D^T\omega) H_1(\omega)$. Combining these two equations yields equation (5).

The above hypothesis may not always be satisfied and hence the exact solution of equation (5) may not work. In addition, $H_0(\omega)$ is not guaranteed to satisfy the desired symmetry constraints. The 2D Haar filter is an example where the hypothesis is satisfied, and an exact FIR filter solution can be found.

In cases where the hypothesis fails, an alternative solution is proposed based on least-square approximation. The desired filter $H_0(\omega)$ needs to minimize the error function:

$$V_r(H_0) = \sum_{i=1}^{r} \left(\frac{1}{L_i}\right) \|G_i - G_{i-1}^{**} H_{0i}\|^2$$

where $H_{0i}$ is the upsampled version of $H_0$, r is the number of scales used in the analysis, $L_i = M_i N_i$ is the size of the filter $G_i$, and ** denotes 2D convolution.

It can be shown that $V_r(H_0)$ is minimum if $H_0$ of size M×N is given by:

$$H_0 = \sum_{n=1}^{N} N_n^T h_0 v_n^T \quad \text{where} \quad h_0 = EC^{-1} a \qquad (6b)$$

with $$v_n = \begin{bmatrix} 0 \\ \vdots \\ 1 \\ \vdots \\ 0 \end{bmatrix} \begin{matrix} 1 \\ \vdots \\ n \\ \vdots \\ N \end{matrix} \quad \text{and} \quad N_n = \begin{bmatrix} 0 \\ \vdots \\ I \\ \vdots \\ 0 \end{bmatrix} \begin{matrix} 1 \\ \vdots \\ n \\ \vdots \\ N \end{matrix}$$

$$C = \sum_{i=1}^{r} (1/L_i) C_i \qquad a = \sum_{i=1}^{r} (1/L_i) a_i$$

$$C_i = B_{i-1}^T \mathcal{G}_{i-1}^T \mathcal{G}_{i-1} B_{i-1} \qquad a_i = B_{i-1}^T \mathcal{G}_{i-1}^T g_i \qquad B_i = \left(\prod_{j=0}^{i} U_j\right) E$$

$\mathcal{G}_i$ is the 2D convolution matrix corresponding to the 2D filter $G_i$, $U_i$ is the upsampling matrix corresponding to the rectangular lattice decimator, $$D = \begin{bmatrix} 2 & 0 \\ 0 & 2 \end{bmatrix},$$

E is the matrix used to impose the symmetry constraints on the filter, where $h_0 = Eh_{00}$ with $h_{00} = C^{-1} a$.

The dimensions of these matrices are as follows: $v_n$ is N×1, $N_n$ is MN×1, $h_{00}$ is $M_{00} \times N_{00}$, E is $MN \times M_{00} N_{00}$, $g_i$ is $M_i N_i \times 1$, $a_i$ and a are $M_{00} N_{00} \times 1$, $C_i$ and C are $M_{00} N_{00} \times M_{00} N_{00}$, $U_i$ is $(M_{i+1}+1-M_i)(N_{i+1}+1-N_i) \times (M_i+1-M_{i-1})(N_i+1-N_{i-1})$, and $B_i$ is $(M_{i+1}+1-M_i)(N_{i+1}+1-N_i) \times (M_{00} N_{00})$.

In summary, a 2D filter bank is designed by the following steps.

Choose or design a 2D filter with a desired indicator response for the feature of interest.

Generate a set of 2D filters sampled on a rectangular lattice as described above.

Apply equations (5) and (6a) or (6b) described above to determine the equivalent filter bank.

These steps were followed to implement a 2D filter using a 2D vertical Haar filter bank, using a horizontal Haar filter bank, a 2D vertical Sobel filter bank, and a 2D diagonal Sobel filter bank. The results of this implementation are summarized in Table 1.

TABLE 1

| | | | |
|---|---|---|---|
| Vertical Haar | $H_0$ | row 1 | 1 2 1 |
| | | row 2 | 0 0 0 |
| | | row 3 | 1 2 1 |
| | $H_1$ | row 1 | −1 −1 1 1 |
| | | row 2 | −1 −1 1 1 |
| | | row 3 | −1 −1 1 1 |
| | | row 4 | −1 −1 1 1 |
| Horizontal Haar | $H_0$ | row 1 | 1 0 1 |
| | | row 2 | 2 0 2 |
| | | row 3 | 1 0 1 |
| | $H_1$ | row 1 | −1 −1 −1 −1 |
| | | row 2 | −1 −1 −1 −1 |
| | | row 3 | 1 1 1 1 |
| | | row 4 | 1 1 1 1 |
| Vertical Sobel | $H_0$ | row 1 | 0.6956 1.3591 0.956 |
| | | row 2 | 0.0242 0.0362 0.0242 |
| | | row 3 | 0.6956 1.3591 0.6956 |
| | $H_1$ | row 1 | −1 −1 0 1 1 |
| | | row 2 | −1 −1 0 1 1 |
| | | row 3 | −2 −2 0 2 2 |
| | | row 4 | −1 −1 0 1 1 |
| | | row 5 | −1 −1 0 1 1 |
| Horizontal Sobel | $H_0$ | row 1 | 0.6956 0.0242 0.6956 |
| | | row 2 | 1.3591 0.0362 1.3591 |
| | | row 3 | 0.6956 0.0242 0.6956 |
| | $H_1$ | row 1 | −1 −1 −2 −1 −1 |
| | | row 2 | −1 −1 −2 −1 −1 |
| | | row 3 | 0 0 0 0 0 |
| | | row 4 | 1 1 2 1 1 |
| | | row 5 | 1 1 2 1 1 |
| Diagonal Sobel | $H_0$ | row 1 | 0.3739 0.3022 0.8545 |
| | | row 2 | 0.3022 0.6794 0.3022 |
| | | row 3 | 0.8545 0.3022 0.3739 |
| | $H_1$ | row 1 | −1 −1 −1 −1 0 |
| | | row 2 | −1 −1 −1 0 1 |
| | | row 3 | −1 −1 0 1 1 |
| | | row 4 | −1 0 1 1 1 |
| | | row 5 | 0 1 1 1 1 |

Once the filter bank is derived, the multiscale MAP correlator 20 that works with it can be designed not only to detect the feature in the presence of noise, but also to distinguish several characteristics of the feature such as edges and end-points. Whereas in the past decisions based on the outputs of the filter were often heuristic, the multiscale MAP correlator 20 according to the present invention is well structured and optimized to minimize the detection error.

To reduce the computation burden on the correlator 20 the chosen "indicators" in each filtered signal 14a–c are first located by the multiscale detector 16. Starting from the lowest scale, the detected indicator locations are then traced across the different scales. The rule for tracing is to connect an indicator location at the lower scale to the spatially closest indicator at the next higher scale. This is repeated for all the observable scales. The result is a "scale-space tree" giving us the locations of the indicators at each scale. This scale space tree is the input to the MAP correlator 20.

An optimal and structured MAP correlator 20 is derived with little or no information about the signal or the noise. The decision of the MAP correlator 20 is based on the actual filter outputs corresponding to the locations of the indicators in the scale-space tree. The correlator 20 is designed to minimize the probability of error. To simplify the design of the MAP correlator, it is assumed that the noise samples are independent, and identically distributed with a Gaussian distribution. The hypothesis testing problem becomes one of deciding whether a located feature corresponds to noise or an actual signal. Depending on the type of desired indicators, the correlator 20 may combine more than one response from each scale. For example, a zero-crossing is marked by checking a sign change in two consecutive locations. The two hypotheses are shown to have multivariate Gaussian distributions. The difference between the two densities lies in the mean. The test does not depend on signal to noise ratio, but only the desired signal. Details on the design of a 1D multiscale MAP correlator and a 2D multiscale MAP correlator will now be given.

Assume that the input signal to the multiscale filter bank 10 has the desired feature embedded in noise. Let us denote the input signal samples by x(k), where k represents spatial or temporal position. Denote the noise samples an n(k), and the feature samples by s(k), $$x(k)=s(k)+n(k).$$

The noise samples are assumed to be "independent and identically distributed" ("i.i.d.") with marginal distribution $N(0,\sigma^2)$. Therefore, the input samples x(k) are i.i.d. whose distribution P can be represented as:

$$P = \begin{cases} N(s(k), \sigma^2) & \text{if signal present} \\ N(0, \sigma^2) & \text{if only noise present} \end{cases}$$

It is an i.i.d. sequence with Gaussian distribution.

The outputs at different scales are linear combinations of the Gaussian input. Denote the output of a filter $h_i$ at scale i by the samples $y_i(k)$. Collect these samples from different scales into a vector $y_k=[y_1(k)\ y_2(k) \ldots ]^T$. Let H represent the convolution matrix associated with the filters at different scales $h_i$, and $x_k$ the set of samples convolved with H at time (position) k, $$y_k = Hx_k.$$

H represents a linear transformation applied to the input.

The number of input samples needed has to match the largest filter. Let n be the size of the largest $h_i$ filter, and p the number of scales used in the filter. It can be shown that the distribution of the linear combination of the n-tuples $x_k$ is a Gaussian random variable. In addition, samples of the vector $y_k$ are jointly Gaussian. Their joint density function f is characterized by the first two moments. The mean of the observation vector $y_k$ can be derived by:

$$m_{y_k} = H m_{x_k}$$

where $m_{y_k}$ and $m_{x_k}$ are the means of the input and the output respectively. The output correlation matrix $R_{y_k}$ can be written in terms of the input correlation matrix $R_{x_k}$ and H:

$$R_{y_k} = H R_{x_k} H^T$$

Since the noise samples at the input are i.i.d. with zero mean, the covariance matrix is the same as the correlation matrix. The mean and the correlation give the density at the output:

$$f(y_k) = \frac{1}{(2\pi)^{\frac{p}{2}} |R_{y_k}|^{\frac{1}{2}}} e^{-\frac{1}{2}(y_k - m_{y_k})^T R_{y_k}^{-1}(y_k - m_{y_k})} \quad (7)$$

$$m_{y_k} = \begin{cases} Hs_k & \text{if the feature is present} \\ 0 & \text{if only noise present} \end{cases}$$

Denote $f(y_k)$ by $f_0(y_k)$ when only noise is present, and denote it by $f_1(y_k)$ in the presence of the desired signal.

If we denote by $H_0$ the hypothesis when only noise is present, and by $H_1$ in the presence of the desired feature, the two hypotheses are associated with the densities $f_0$ and $f_1$ respectively. To determine that a feature is present at time position k, the likelihood ratio test is applied to the two densities. $L(y_k)=f_1(y_k)/f_0(y_k)$. Assuming uniform costs in erroneous detections, the Bayes detector can be reformulated as:

$$\delta_B(y) = \begin{cases} 1 & \text{if } f_1(y_k) \geq f_0(y_k) \\ 0 & \text{otherwise} \end{cases}$$

Substituting by the density given above, the MAP correlator 20 becomes:

$$\delta_B(y) = \begin{cases} 1 & \text{if } (y_k^T R_{y_k}^{-1} H s_k) \geq (1/2)(s_k^T H^T R_{y_k}^{-1} H s_k) \\ 0 & \text{otherwise} \end{cases} \quad (8)$$

Note that the test performed by the MAP correlator 20 does not depend on the signal to noise ratio, but only on the signal/feature sought. This test is useful, when the desired feature is indicated by a single position, such as a signal maxima.

The test performed by the MAP correlator 20 is different when the feature indication is a zero crossing. In this case two consecutive positions are indicated for each feature, and these must be examined. The two consecutive positions are at k and k+1 to give $y_k$ and $y_{k+1}$. The two vectors are combined by interleaving to give us $Y_k=[y_1(k)y_1(k+1)y_2(k)y_2(k)y_2(k+1) \ldots ]^T$. The indexing represents the different scales. Again here, $Y_k$ can be written as a linear combination of the input samples $x_k$. Recall that $y_k=Hx_k$. Assume that the largest filter $h_i$ has size n. Take n+1 samples of the input centered at k, i.e. one extra sample added to $x_k$, denote it by $X_k$. Let $$H = \begin{bmatrix} h^{1T} \\ h^{2T} \\ \vdots \end{bmatrix} \quad H' = \begin{bmatrix} h^{1T} & 0 \\ 0 & h^{1T} \\ h^{2T} & 0 \\ 0 & h^{2T} \\ \vdots & \vdots \end{bmatrix}$$

Then $$Y_k = H'X_k.$$

The MAP correlator 20 for zero crossings can then be derived using the above equation (8), where H is replaced by H', $y_k$ by $Y_k$, and $x_k$ by $X_k$.

Detection of features in 2D signals, such as an image, is based on the indications collected across all scales of the multiscale filter 10 and detector 16. In this case, locating the indicators also depends on the direction of the feature. For example, maxima occur along the gradient direction of edges. Once these locations are detected at all the scales, the observations at those locations are linked to form the scale space tree. This tree is then fed to the MAP correlator 20 to decide whether the feature is present or not.

Assume that the input samples to the filter bank in FIG. 1 has the desired 2D feature (signal) embedded in noise. Denote those input samples by x(k,l), where k and l represent the spatial coordinates, the noise samples by n(k,l), and the feature samples corresponding to hypothesis j by $s_j(k,l)$, we have $$x(k,l) = s_j(k,l) + n(k,l)$$

The noise samples are assumed to be independent and identically distributed ("i.i.d.") with marginal distribution $N(0,\sigma^2)$. Consequently, the input samples x(k,l) are also i.i.d. and the distribution $P_j$ corresponding to hypothesis j can be represented as:

$$P = \begin{cases} N(s_j(k,l), \sigma^2) & \text{if signal corresponding to} \\ & \text{hypothesis } j \text{ present} \\ N(0, \sigma^2) & \text{if only noise present} \end{cases}$$

It is an i.i.d. sequence with Gaussian distribution, the difference between the hypotheses lies in the mean.

The filter outputs at different scales are linear combinations of the Gaussian input. Denote the output of the filter $H_i$ at scale I by the samples $y^{(i)}(k,l)$. Collecting these samples from different scales into a vector $y(k,l)=[y^{(1)}(k,l)y^{(2)}(k,l)\ldots]^T$. Let $\mathcal{H}$ represent the convolution matrix associated with the filters $H_i$ from different scales, then $$y(k,l) = \mathcal{H}x(k,l),$$

since $\mathcal{H}$ represents a linear transformation applied to the input.

The input samples size matches the size of the largest filter. Let N be the size of the largest $H_i$ filter, and r be the number of scales used in collecting the observations. It can be shown that the distribution of the linear combination of the n-tuples x(k,l) is a Gaussian random variable, and the samples of the vector y(k,l) are jointly Gaussian. Their joint density function f is characterized by the first two moments. The mean of the observation vector y(k,l) is $$m_{y(k,l)} = \mathcal{H}m_{x(k,l)}$$

where $m_{y(k,l)}$, and $m_{x(k,l)}$ are the means of the input and the output respectively. The output correlation matrix $R_{yy}$ can be written in terms of the input correlation matrix $R_{xx}$ and $\mathcal{H}$:

$$R_{yy} = \mathcal{H}R_{xx}\mathcal{H}^T.$$

Since the noise samples at the input are i.i.d. with zero mean, the covariance matrix is the same as the correlation matrix. The mean and the correlation give the density function of y(k,l).

$$f(y(k,l)) = \frac{1}{(2\pi)^{\frac{r}{2}}|R_{yy}|^{\frac{1}{2}}} e^{\frac{1}{2}(y(k,l)-m_{y(k,l)})^T R_{yy}^T (y(k,l)-m_{y(k,l)})} \quad (9)$$

$$m_{y(k,l)} = \begin{cases} \mathcal{H}s_j(k,l) & \text{if signal corresponding to} \\ & \text{hypothesis } j \text{ is present} \\ 0 & \text{if only noie is present} \end{cases}$$

Denote f(y(k,l)) by $f_0(y(k,l))$ when only noise is present, and denote it by $f_j(y(kl))$ in the presence of the signal from hypothesis j.

Assuming uniform costs in erroneous detections, the Bayes detector can be reformulated as:

$$\delta_B(y) = \begin{cases} 1 & \text{if } f_1(y(k,l)) \geq f_0(y(k,l)) \\ 0 & \text{otherwise} \end{cases}.$$

With the density given above, the 2D MAP correlator 20 is $$\delta_B(y) = \tag{10}$$
$$\begin{cases} 1 & \text{if } (y(k,l)^T R_{yy}^{-1} \mathcal{H} s_1(k,l)) \geq \left(\frac{1}{2}\right)(s_1(k,l)^T H^T R_{yy}^{-1} \mathcal{H} s_1(k,l)) \\ 0 & \text{otherwise} \end{cases}.$$

The hypothesis testing problem becomes one of deciding whether a located feature corresponds to noise or actual signal. The two hypothesis have multivariate Gaussian distributions with different mean. The test does not depend on signal to noise ratio, but only on the desired signal. The 2D MAP correlator 20 decides that a feature is present at position (k,l) if $$y(k,l)^T \cdot R_{yy}^{-1} H s_1(k,l) \geq \frac{1}{2} s_1(k,l)^T \mathcal{H}^T R_{yy}^{-1} \mathcal{H} s_1(k,l) \tag{11}$$

where:

$y(k,l)^T$ is an indicator location vector at k,l;

$R_{yy}^{-1} H s_1(k,l)$ is a correlation vector at k,l; and $$\frac{1}{2}(s_1(k,l))^T \mathcal{H}^T R_{yy}^{-1} \mathcal{H} s_1(k,l)$$

is a threshold value.

Note that the test does not depend on the signal to noise ratio, but only on the feature signal sought.

DESCRIPTION OF THE PREFERRED EMBODIMENT

Figure 6:
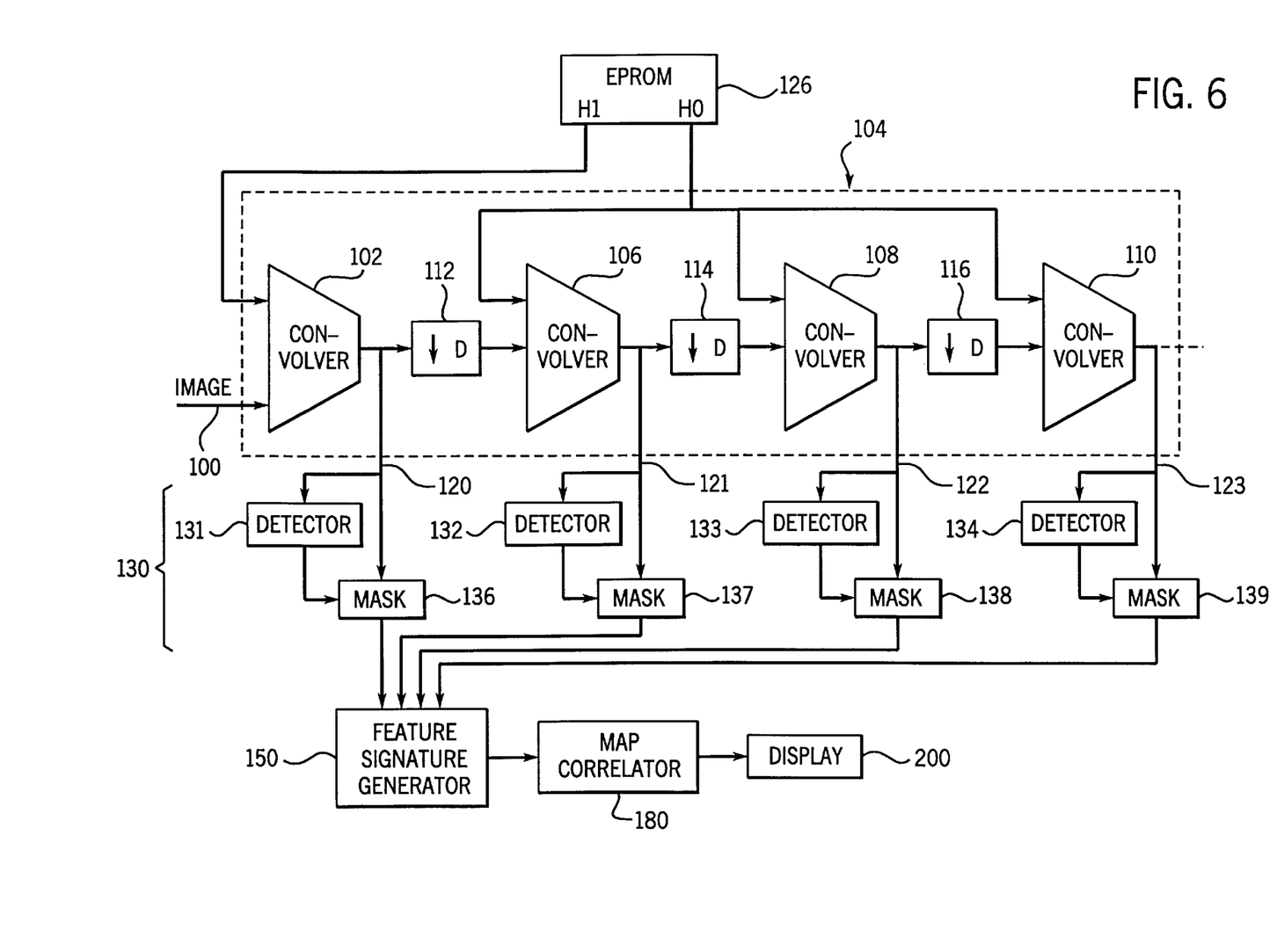
FIG. 6 is an electrical block diagram of the preferred embodiment of the invented feature detection system.

The preferred embodiment of the invention is employed to detect edges in images produced by an ultrasonic imaging system. Referring particularly to FIG. 6 the image to be processed is received at input 100 as a 400 by 400 pixel array of image intensity data. This image data is applied to one input of a convolver 102 that forms the first stage of a multiscale filter bank indicated by dashed line 104. The multiscale filter 104 includes three additional convolvers 106, 108 and 110 which are connected in series to form the remaining three stages of the multiscale filter 104. Decimators 112, 114 and 116 connect the successive filter stages and sample every other pixel value to change the scale of successive filter stages. The outputs of the convolvers 102, 106, 108 and 110 form the respective multiscale outputs 120–123, where:

Scale 1 is at 120;

Scale 2 is at 121;

Scale 3 is at 122;

Scale 4 is at 123;

The convolvers 102, 106, 108 and 110 are identical and are constructed using digital signal processing ("DSP") components. The convolvers perform a convolution operation on the image array received at one of its inputs with a convolution kernel applied to its other input. The convolver 102 receives a convolution kernel H1 from an EPROM 126 and the remaining convolvers 106, 108 and 110 receive a convolution kernel $H_0$. In this preferred embodiment a Haar filter function kernel is employed and $H_0$ and $H_1$ are derived as described above to yield the following:

$$H_0 = \begin{bmatrix} 1 & 2 & 1 \\ 0 & 0 & 0 \\ 1 & 2 & 1 \end{bmatrix}$$

$$H_1 = \begin{bmatrix} -1 & -1 & 1 & 1 \\ -1 & -1 & 1 & 1 \\ -1 & -1 & 1 & 1 \\ -1 & -1 & 1 & 1 \end{bmatrix}$$

It can be appreciated that other filter functions can be implemented and their kernels stored in the EPROM 126 for application to the multiscale filter 104 when the need arises.

Each convolver 102, 106, 108, 110 can be implemented by Fourier transforms of the image array and the convolution kernel applied to its inputs, matrix multiplies them, and inverse Fourier transforms the result to produce the filtered output image array.

The decimators 112, 114 and 116 are also constructed using DSP components. They implement the following decimation matrix:

$$D = \begin{bmatrix} 2 & 0 \\ 0 & 2 \end{bmatrix}$$

to sample every other pixel as illustrated by the sampling lattice in FIG. 5.

Figure 7:
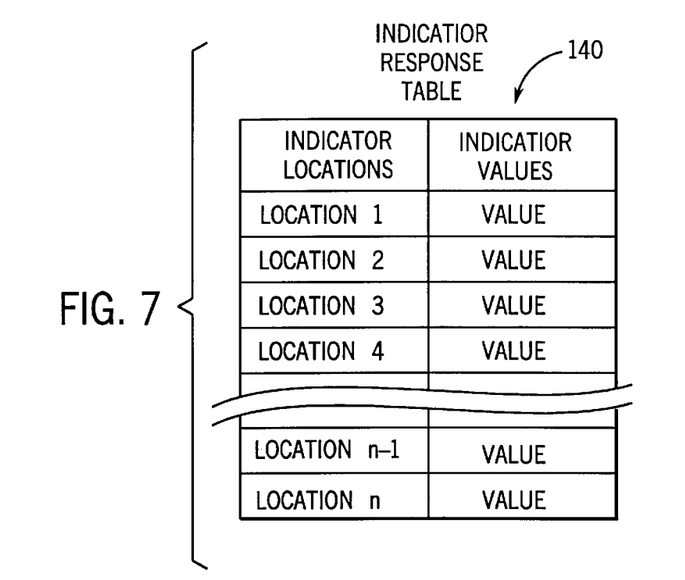
FIG. 7 is a schematic representation of an indicator response table which is a data structure employed in the system of FIG. 6.

The filtered image arrays produced at the filter outputs 120–123 are applied to the inputs of a multiscale detector indicated generally at 130. Each of the filtered images is processed by a separate detector channel comprised of respective detectors 131–134 and masks 136–139. Each detector 131–134 scans the filtered image array applied to its input and indicates the location therein of the "indicator response" of interest. In the preferred embodiment a peak detector is employed, and the detectors 131–134 indicate the location of peaks, or maxima in the filtered image intensity data. These locations are output to the corresponding mask 136–139, which forms an "indicator response table" by reading the filtered image intensity value at each indicated "peak" location. Each channel of the multiscale detector 130 thus produces an indicator response table such as that shown at 140 in FIG. 7 which lists the location of each peak and the value of the peak. In the preferred embodiment, the functions performed by the multiscale detector 130 are carried out by a general purpose processor under the direction of a stored program.

The indicator response tables 140 are input to a feature signature generator 150. In the preferred embodiment the function performed by this generator 150 is carried out by a stored program which is executed to perform the steps indicated by the flow chart in FIG. 9. This program examines the indicator response table 140 for each scale, and produces a scale space tree ("SST") table which is illustrated at 142 in FIG. 8.

Figure 9:
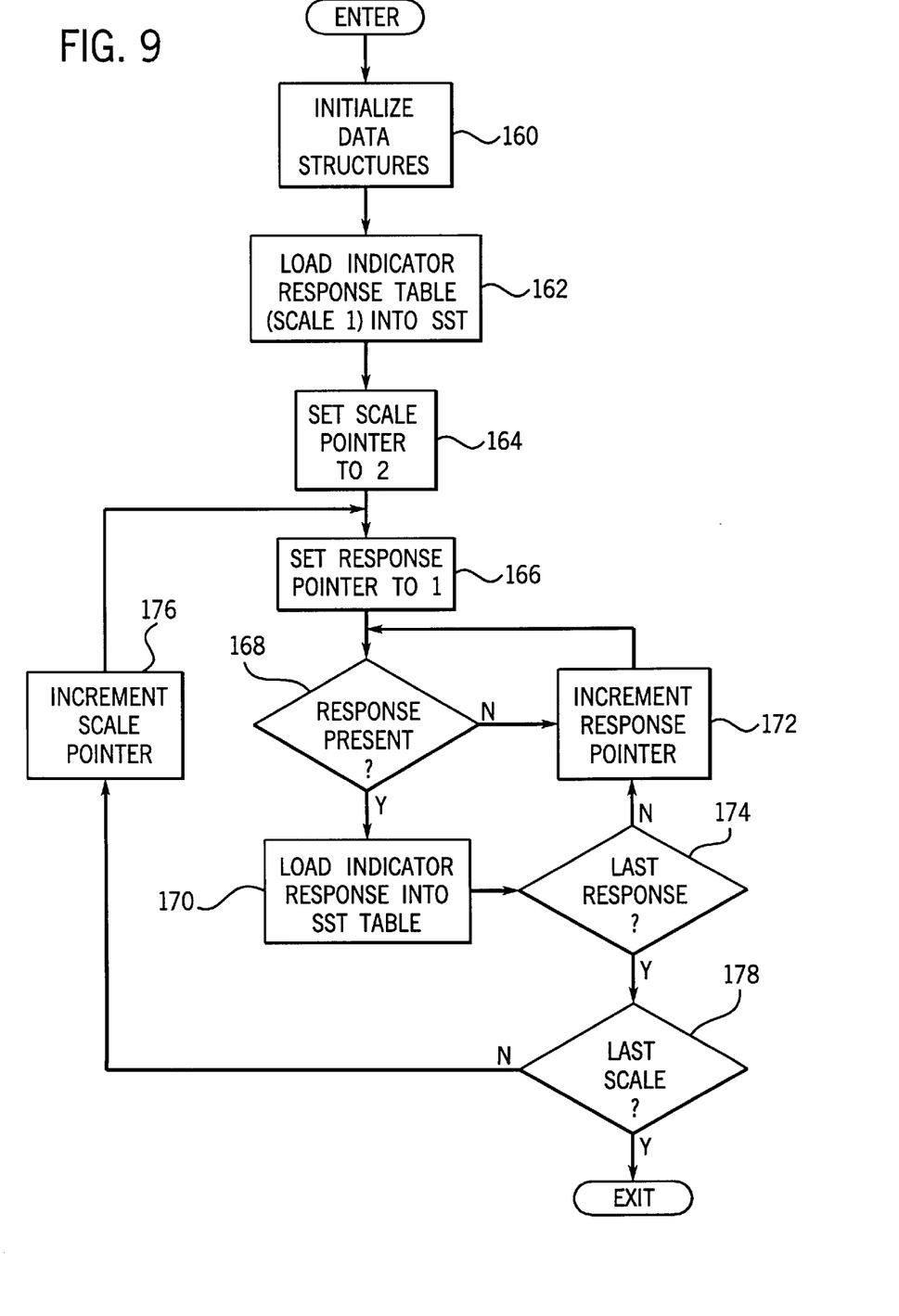
FIG. 9 is a flow chart of the functions performed by a feature generator which forms part of the system of FIG. 6.

Referring to FIG. 9, the first step in the procedure is to initialize the relevant data structures as indicated by process block 160. This includes, for example, clearing the SST table 142. The indicator responses 140 for the first scale are then stored in the first row of the SST table 142 as indicated at process block 162. This is the highest resolution scale and the indicator response table 140 for scale 1 will contain the most entries. A scale pointer is then set to read the indicator response table 140 for scale 2, as indicated at process block 164, and a loop is entered in which the indicated peaks in scales 2, 3 and 4 are examined.

Referring still to FIG. 9 each indicator response table 140 is examined by setting a response pointer to "1" at process block 166 to read the location of the first indicated peak. If this location corresponds (plus or minus one pixel location) with a peak location indicated in the previous scale, as determined at decision block 168, the value for that location and scale is loaded into the SST table 142 as indicated at process block 170. Otherwise, the system loops back to examine the next indicator response after incrementing the response pointer at 172. After the last indicator response in the table 140 has been examined, as determined at decision block 174, the scale pointer is incremented at 176 and the indicator response table 140 for the next scale is examined. The process terminates when the last scale is finished as determined at decision block 178.

Figure 8:
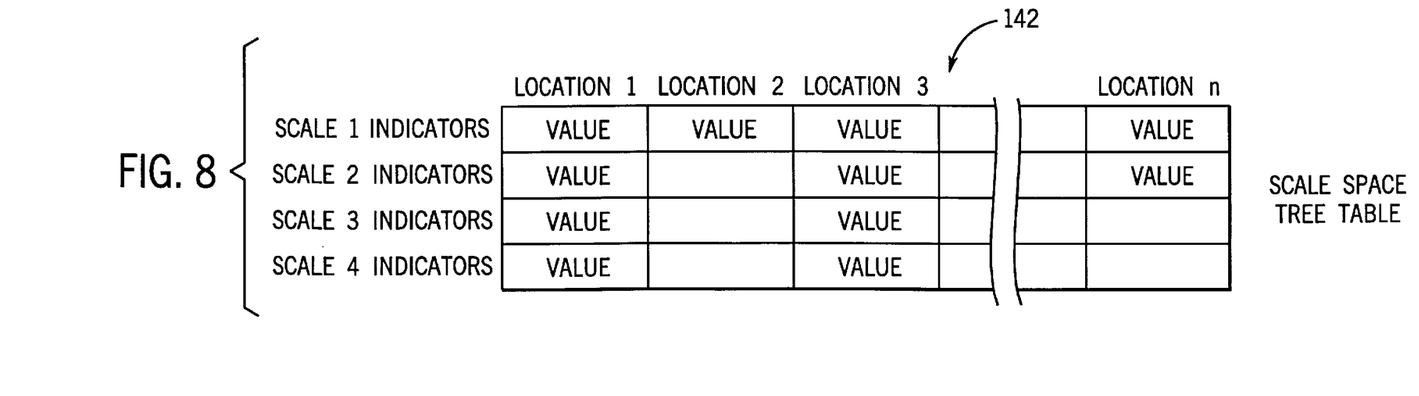
FIG. 8 is a schematic representation of a scale space tree table which is a data structure employed in the system of FIG. 6.

Referring particularly to FIG. 8, the resulting SST table 142 stores a set of n pixel locations at which peaks were found in the scale I indicator response table 140. Where corresponding peaks were found at higher scales, values are entered for those scales. It should be apparent that locations where peaks were found at all scales have a higher probability of being the location of an edge, whereas locations with indicator values at only scale I are likely noise or weaker edges. The values at each SST table location (i.e. each column in FIG. 8) is referred to herein as an "indicator location vector", and it is this vector which is examined to determine if an edge is present at that location. The values in each indicator location vector can be viewed as a "signature" of some feature in the image produced by the multiscale filter 104.

Referring again to FIG. 6 the SST table 142 produced by the feature signature generator 150 is examined by a MAP correlator 180 to determine which indicator location vectors therein represent true edges. The functions performed by the MAP correlator 180 are carried out by a general purpose computer which executes a program illustrated by the flow chart in FIG. 10.

Figure 10:
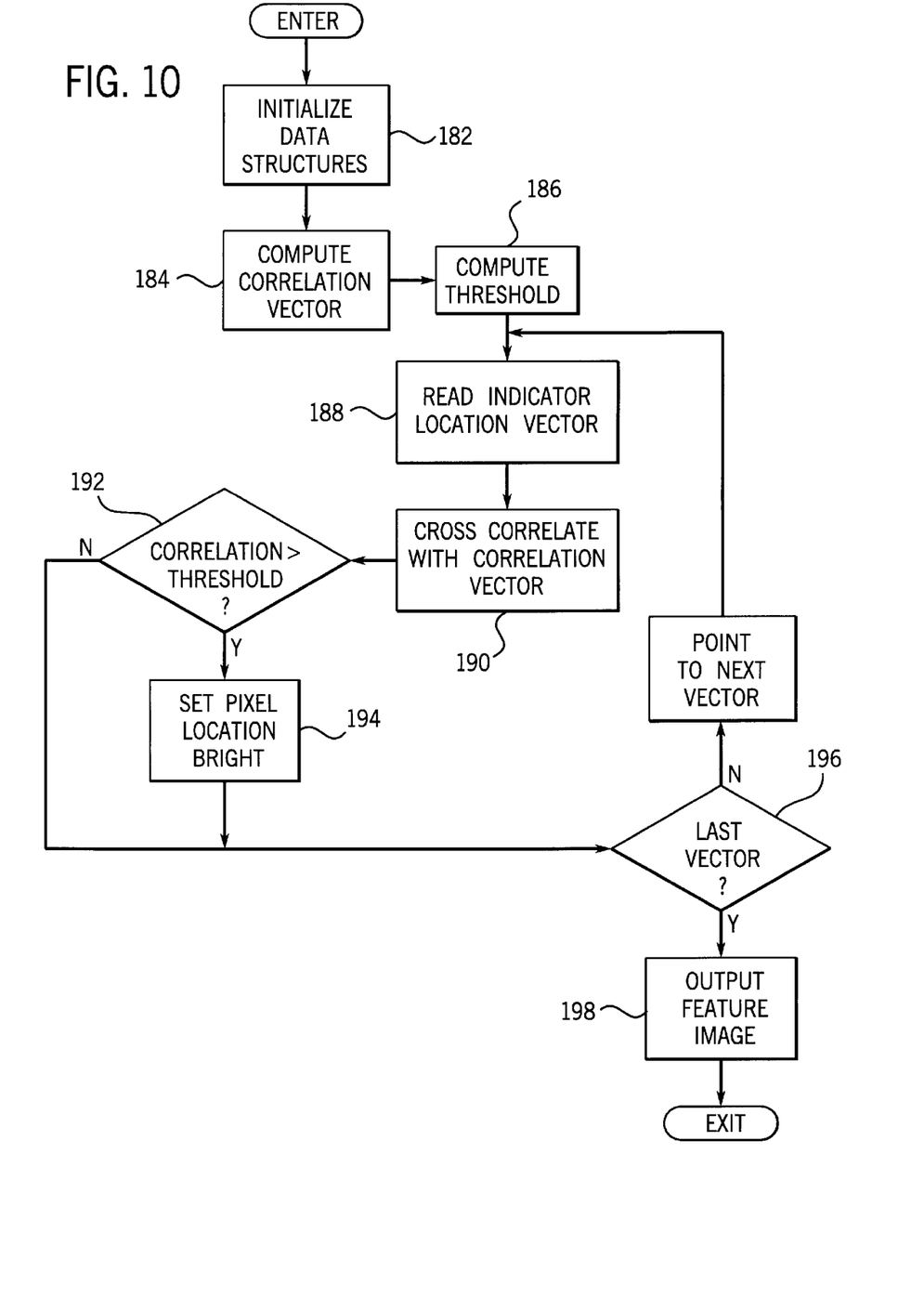
FIG. 10 is a flow chart of the functions performed by the MAP correlation which forms part of the system of FIG. 6.

Referring particularly to FIG. 10, the first step performed by the MAP correlator 180 is to initialize the data structures as indicated by process block 182. Such structures include, for example, a feature image array which is set to zero, or "black". As indicated by the above equation 11, a correlation vector is then calculated at block 184. This correlation vector may be viewed as the ideal indicator location vector produced by the multiscale filter 104 in response to an edge in the input image. Next, a threshold value is calculated at process block 186. This calculation is also indicated in the above equation 11. A loop is then entered in which each indicator location vector in the SST table 142 is read at process block 188, cross correlated with the correlation vector at process block 190, and the calculated correlation value compared with the threshold at decision block 192. If the indicator location vector is similar enough to the correlation vector that the calculated correlation value exceeds the threshold, an edge is present and the pixel at the vector location is set to a bright value at process block 194. Otherwise, process block 194 is skipped. This process continues until each indicator location vector in the SST table 142 is examined. When the last vector has been examined as determined at decision block 196, the feature image is complete and it is output at process block 198 to a display 200 (FIG. 6). The feature image indicates each detected edge as a bright line. This may be the final objective, or further steps may be carried out using this feature image to locate and identify shapes, and calculate their areas or volumes.

What is claimed is:

1. A detector system for locating a feature in an input signal, the combination comprising:
   a multiscale filter which applies a filter operator to the input signal to produce a plurality of filtered output signals at a corresponding plurality of scales;
   a multiscale detector which receives the filtered output signals and produces a table which indicates the possible locations in the input signal of the detected feature therein; and
   a MAP correlator which examines the table and correlates the values therein at each indicated feature location with a model response, said MAP correlator producing an output signal indicating the location of the feature if the correlation exceeds a preset threshold.

2. The detector system as recited in claim 1 in which the input signal is a two-dimensional image and the output signals form a bit map.

3. The detector system as recited in claim 1 in which the multiscale detector includes a feature signature generator which produces the table by forming a scale space tree from the corresponding locations in each filtered output signal at which the feature is detected.

4. The detector system as recited in claim 1 in which the multiscale filter is a filter bank comprised of a set of series connected filter stages.

5. The detector system as recited in claim 4 in which each filter stage includes a convolver which receives the input signal and convolves it with a filter kernel, and in which the first filter bank stage employs a filter kernel $H_1$ and the remaining filter bank stages employ a filter kernel $H_0$.

6. The detector system as recited in claim 1 in which the input signal is a series of two-dimensional images and the output signals form a series of bit maps.

* * * * *